(12) United States Patent
Kim

(10) Patent No.: US 7,690,826 B2
(45) Date of Patent: Apr. 6, 2010

(54) ADAPTIVE FRONT LIGHT SYSTEM USING LED HEADLAMP

(75) Inventor: Jong-Un Kim, Gyeongsan (KR)

(73) Assignees: SL Seobong, Cheonan (KR); SL Lighting, Daegu (KR)

( * ) Notice: Subject to any disclaimer, the term of this patent is extended or adjusted under 35 U.S.C. 154(b) by 0 days.

(21) Appl. No.: 11/946,895

(22) Filed: Nov. 29, 2007

(65) Prior Publication Data
US 2009/0141513 A1    Jun. 4, 2009

(51) Int. Cl.
*B60Q 1/04* (2006.01)
(52) U.S. Cl. .................. 362/545; 362/544; 362/517; 362/518
(58) Field of Classification Search .......... 362/509, 362/516, 517, 518, 538, 539, 543, 544, 545, 362/800
See application file for complete search history.

(56) References Cited

U.S. PATENT DOCUMENTS

| | | | |
|---|---|---|---|
| 7,108,412 B2 * | 9/2006 | Ishida et al. ............. | 362/518 |
| 7,128,453 B2 * | 10/2006 | Tatsukawa et al. ......... | 362/544 |
| 7,249,877 B2 * | 7/2007 | Johnson et al. ............ | 362/545 |
| 7,357,546 B2 * | 4/2008 | Ishida et al. ............. | 362/545 |

* cited by examiner

*Primary Examiner*—Y My Quach Lee
(74) *Attorney, Agent, or Firm*—Edwards Angell Palmer & Dodge LLP; Kongsik Kim

(57) ABSTRACT

Provided is an adaptive front light system (AFLS) for a vehicle. The AFLS comprising one or more light-emitting diode (LED) lamp units and a housing which accommodates the LED lamp units, wherein each of the LED lamp units comprises one or more LEDs as its light source and a reflector which reflects light emitted by the light source so that the reflected light can be directed forward, and said adaptive front light system is operable to form different beam patterns by selectively turning on or off the lamp units, and wherein one or more reflectors of the lamp units comprise a multi-face reflector including a plurality of cells having different curvature radiuses or focal points.

15 Claims, 12 Drawing Sheets

ADAPTIVE FRONT LIGHT SYSTEM USING LED HEADLAMP

BACKGROUND OF THE INVENTION

1. Field of the Invention

The present invention relates to an adaptive front light system (AFLS) for a vehicle, and more particularly, to an AFLS having light-emitting diodes (LED) lamp units, which can generate various beam patterns according to various driving circumstances such as road conditions and weather conditions, by selectively turning on or off the LED lamp units according to the road or weather conditions to emit a hot beam, a middle beam, a spread beam and a high beam.

2. Description of the Related Art

Vehicles are generally equipped with various headlights for improving driver's field of vision at night and for indicating the presence of vehicle on a road. Conventional headlights for vehicles include a halogen lamp or a high-intensity discharge (HID) lamp as a light source. The headlights also include a reflector which reflects light emitted from a light source forward. The reflector may include a coating layer which is deposited on the surface of the reflector and is formed of a highly-reflective material such as aluminum or silver powder.

In order to improve driver's field of vision in various driving conditions, an adaptive front light system (AFLS) has been introduced. AFLS is a system for varying the width and length of headlight beams according to driving conditions, road conditions, and other environmental conditions. For example, AFLS may provide additional illumination while cornering at low speed or prevent glare by adjusting the brightness of headlamps.

Conventionally, in order to fully the advantages provided by AFLS, projection-type headlamps have been designed to include a rotation axial member which is connected to a motor and a shield which is attached to the rotation axial member to project various beam patterns by being rotated along with the rotation axial member. Such projection-type headlamps, however, cause electromagnetic waves since the use a motor is required. Further, since additional control equipment is also required, it is difficult to fabricate the headlamps which results in increasing the manufacturing cost.

Conventional reflector-type headlamps generally have insufficient space therein to accommodate a number of reflectors that are needed to various beam patterns. In addition, the conventional reflector-type headlamps only provide some of the functions of AFLS merely by increasing the height of beams or tilting beams using a motor.

SUMMARY OF THE INVENTION

It is an aspect of the present invention to provide realizing various beam patterns according to road or weather conditions by using one or more light-emitting diode (LED) lamp units and reducing glare around an LED light source by using a light absorber.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided an adaptive front light system (AFLS) for a vehicle, which comprises one or more light-emitting diode (LED) lamp units and a housing accommodating the LED lamp unit or units. Each of the LED lamp units comprises one or more LEDs as its light source and a reflector. The reflector is provided commonly for the light sources and reflects light emitted by the light source so that the reflected light can be directed forward. The AFLS is operable to form different beam patterns by selectively turning on or off the lamp units. One or more reflectors of the lamp units comprise a multi-face reflector including a plurality of cells having different curvature radiuses or focal points.

According to another aspect of the present invention, an AFLS comprises one or more light-emitting diode (LED) lamp units and a housing accommodating the LED lamp unit or units. Each of the LED lamp units comprises one or more LEDs as its light source and a reflector. The reflector is provided commonly for the light sources and reflects light emitted by the light source so that the reflected light can be directed forward. The reflectors of the lamp units have different curvature radiuses so that the lamp units be operable to form different beam patterns.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1A:
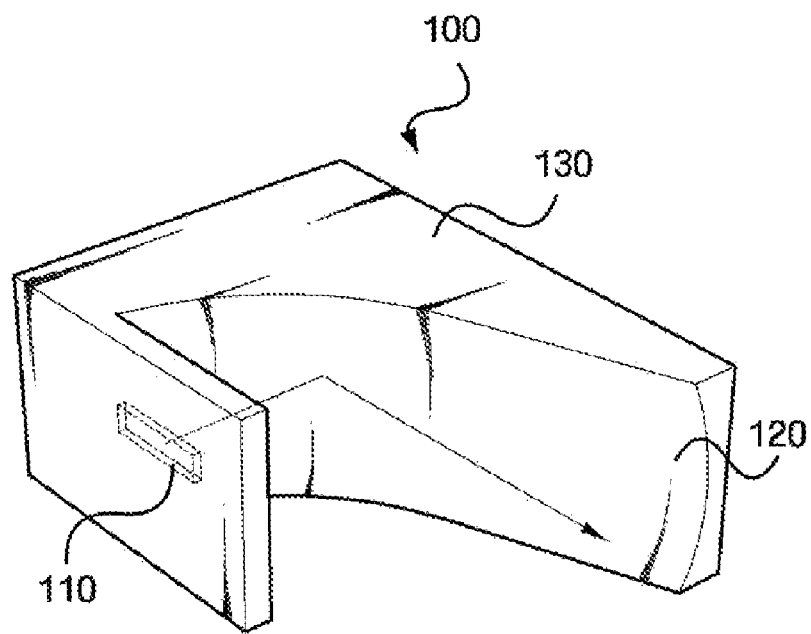
FIG. 1A illustrates a perspective view of a light emitting diode (LED) lamp unit according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 1B:
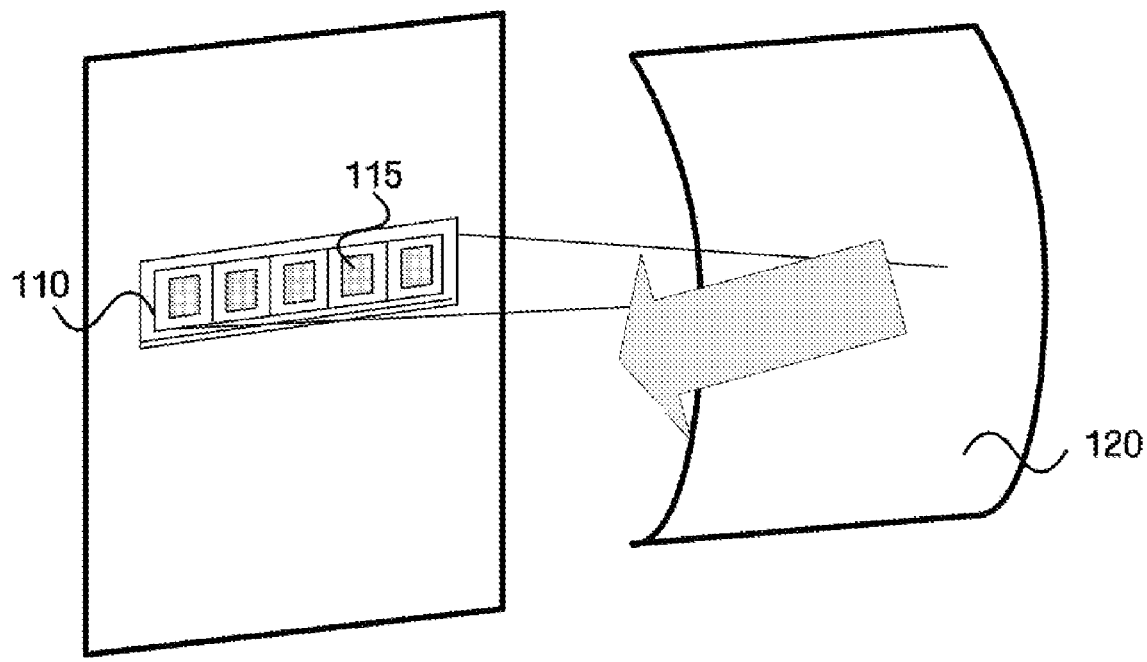
FIG. 1B illustrates the operating principle of the LED lamp unit illustrated in FIG. 1A.
Figure 1C:
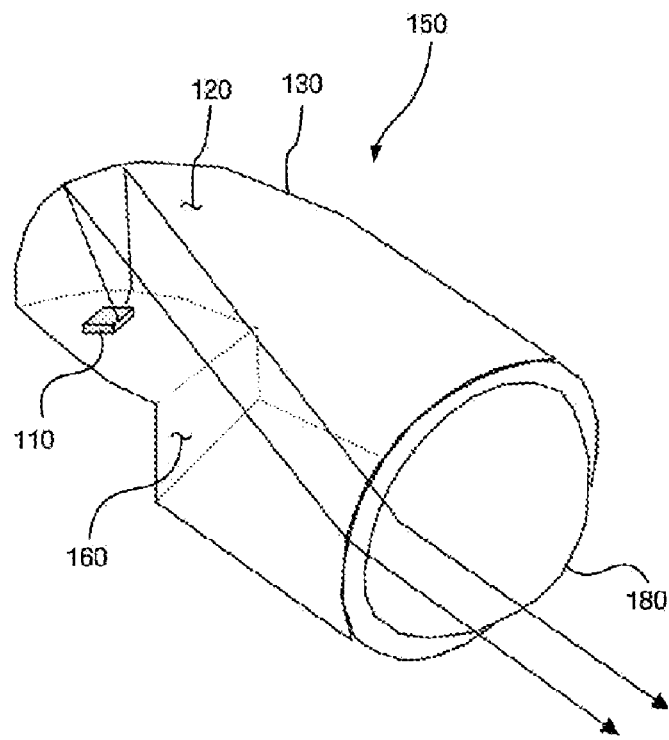
FIG. 1C illustrates a perspective view of an LED lamp unit according to another exemplary embodiment of the present invention.
Figure 1D:
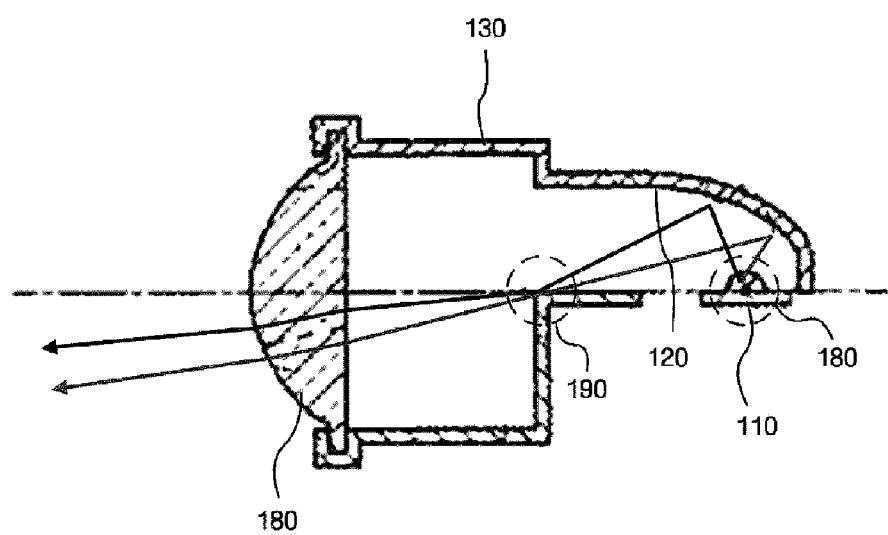
FIG. 1D illustrates the operating principle of the LED lamp unit shown in FIG. 1C.

FIG. 1A illustrates a perspective view of a light-emitting diode (LED) lamp unit 100 according to an exemplary embodiment of the present invention, FIG. 1B illustrates the operating principle of the LED lamp unit 100 shown in FIG. 1A, FIG. 1C illustrates a perspective view of an LED lamp unit 150 according to another exemplary embodiment of the present invention, and FIG. 1D illustrates the operating principle of the LED lamp unit 150 shown in FIG. 1C.

An adaptive front light system (AFLS) according to an exemplary embodiment of the present invention may include one or more light-emitting diode (LED) lamp units 100 and a housing 250 which accommodates the LED lamp units 100. Each of the LED units 100 may include an LED-light-source module 110 and a reflector 120.

The LED-light-source module 110 provides the source of light using one or more LEDs. The amount of light generated by a headlamp using an LED light source is generally less than the amount of light generated by a headlamp using a high-intensity discharge (HID) lamp or a headlamp using a halogen light source. In order to address this, the LED-light-source module 110 may use more than one LED. Therefore, the LED-light-source module 100 may be a module equipped with a row of LEDs. Referring to FIG. 1B, the LED-light-source module 110 may include a row of LED light sources 115, thereby compensating for a shortage of light. For example, referring to FIG. 1B, the LED-light-source module 110 may include a row of five LED light sources 115, and the five LED light sources 115 may be turned on or off at the same time.

The LED-light-source module 110 may also include a power supply unit (not shown) which turns on or off the LED light sources 115.

The reflector 120 reflects light emitted from the LED-light-source module 110 forward. Referring to FIGS. 1A and 1B, the reflector 120 may have a predetermined shape so as to be able to reflect light emitted from the LED-light-source module 110 forward.

The reflector 120 may be formed in various shapes. For example, the reflector 120 may be formed as a parabolic reflector, a linear reflector, or an optical reflector. A main body 130 of the reflector 120 may be formed of a metal such as steel or flame-resistant steel or a heat-resistant plastic material such as a heat-resistant polycarbonate (PC). The main body 130 of the reflector 120 may include a coating layer obtained by depositing a highly-reflective material such as aluminum or silver powder in a vacuum or non-vacuum atmosphere.

A multi-face reflector (MFR), which is divided into one or more cells having different curvature radiuses or different focal points, may be used as the reflector 120. More specifically, in order to form various beam patterns, an MFR having a plurality of cells may be used, and then, the horizontal and vertical curvature radiuses of the cells of the MFR may be appropriately adjusted. More specifically, an MFR having a parabolic structure may be used, and light may be emitted over a long distance, a middle distance, or a short distance according to the curvature radiuses of a plurality of cells of the MFR. Referring to FIG. 1C, the LED lamp unit 150 may include an LED-light-source module 110, a reflector 120, a shield 160 and a lens 170.

The LED-light-source module 110 and the reflector 120 have already been described in detail with reference to FIGS. 1A and 1B, and thus, detailed descriptions of the LED-light-source module 110 and the reflector 120 will be skipped. The shield 160 shields part of light reflected from the reflector 120. The lens 170 concentrates light reflected from the reflector 120.

Referring to FIG. 1D, the LED-light-source module 110 is located at a first focal point 180. Light emitted from the first focal point 180 is reflected by the reflector 120, which is a projection-type reflector, and passes through a second focal point 190. The shield 160 shields part of the light reflected by the reflector 120, thereby adjusting the shape of a beam pattern. The light that passes through the second focal point 190 passes through the lens 170 and can thus be emitted forward. The curvature radius of the reflector 120 may be determined so that light emitted from the first focal point 180 can pass through the second focal point 190.

An LED lamp unit including an LED-light-source module 110 and a reflector 120, like the LED lamp unit 100 shown in FIGS. 1A and 1B, will hereinafter be referred to as a first LED lamp unit 100, and an LED lamp unit including an LED-light-source module 110, a reflector 120, a shield 160, and a lens 170, like the LED lamp unit 150 shown in FIGS. 1C and 1D, will hereinafter be referred to as a second LED lamp unit 150.

FIGS. 2A through 2D illustrate perspective views of AFLSs 200 each including a plurality of LED lamp units, according to exemplary embodiments of the present invention. Referring to FIGS. 2A through 2D, each of the AFLSs 200 may include a plurality of first LED lamps 100 and/or a plurality of second LED lamp units 150. More specifically, each of the AFLSs 200 illustrated in FIGS. 2A and 2B may include two rows of first LED lamp units 100 and generate various beam patterns using the two rows of first LED lamp units 100. The AFLS illustrated in FIG. 2C may include a plurality of first LED lamp units 100 and a plurality of second LED lamp units 150. The AFLS 200 illustrated in FIG. 2D may include two rows of second LED lamp units 150 and generate various beam patterns using the two rows of second LED lamp units 150.

Referring to FIGS. 2A through 2D, each of the first LED lamp units 100 and the second LED lamp units 150 may include an LED-light-source module 110 and a reflector 120. The first LED lamp units 100 or the second LED lamp units 150 may form different beam patterns even though they are of the same type. That is, even LED lamp units of the same type may form different beam patterns according to the structure of reflectors 120 included therein.

Referring to FIGS. 2A through 2D, the reflectors 120 of the first LED lamp units 100 or the second LED lamp units 150 may be MFRs having a plurality of cells having different curvature radius or different focal points. In this case, it is possible to control the direction and the degree of dispersion of light incident upon the reflector 120 in units of the cells of the MFRs.

Figure 2A:
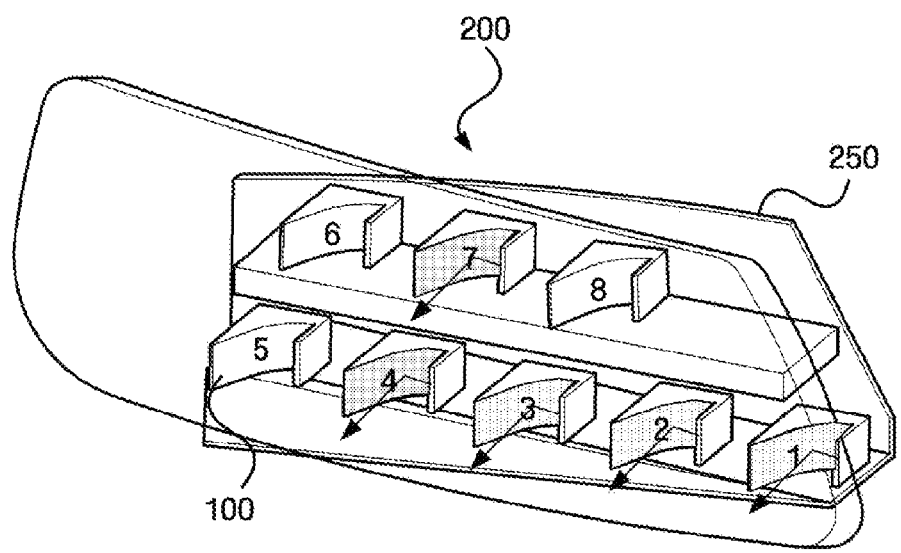
FIG. 2A illustrates a perspective view of an adaptive front light system (AFLS) having a plurality of LED lamp units, according to an exemplary embodiment of the present invention.
Figure 2B:
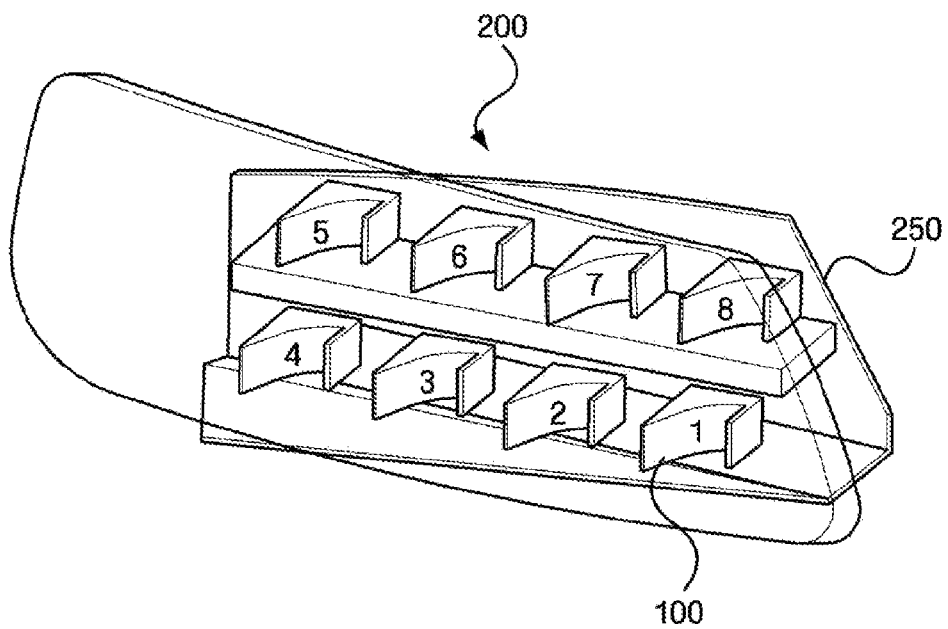
FIG. 2B illustrates a perspective view of an AFLS having a plurality of LED lamp units, according to another exemplary embodiment of the present invention.
Figure 2C:
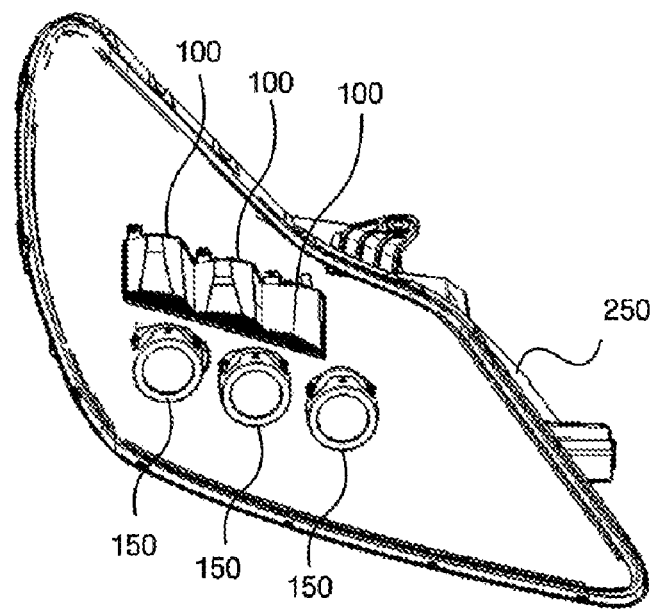
FIG. 2C illustrates a perspective view of an AFLS having a plurality of LED lamp units, according to another exemplary embodiment of the present invention.
Figure 2D:
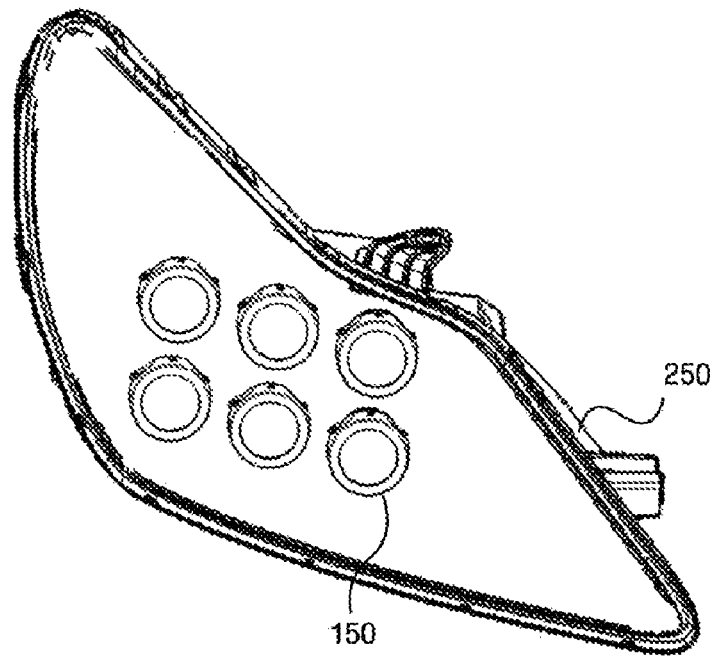
FIG. 2D illustrates a perspective view of an AFLS having a plurality of LED lamp units, according to another exemplary embodiment of the present invention.

Referring to FIGS. 2C and 2D, the second LED lamp units 150 may be projection-type lamp units. In this case, the curvature radius of each of the reflectors 120 of the second LED lamp units 150 may be appropriately adjusted so that light emitted from a first focal point 180, i.e., light emitted from each of the LED-light-source module 110 of the second LED lamp units 150, can be concentrated into a second focal point 190 and can be emitted forward, as described with reference to FIG. 1D. Therefore, the vertical and horizontal curvature radius of each of the reflectors 120 of the second LED lamp units 150 may be appropriately adjusted in units of a plurality of cells of a corresponding reflector 120 so that various beam patterns can be formed, and that beams can be emitted over a long distance, a middle distance, and a short distance.

MFRs may be applied to the first LED lamp units 100, and projection-type reflectors may be applied to the second LED lamp units 150.

Referring to FIGS. 2A through 2D, one or more LED lamp units may be arranged on and attached onto a housing 250. More specifically, in the case of emitting light by applying power to an LED lamp unit 100, the LED lamp unit 100 may be attached onto a housing 250 so that light can be emitted straight forward from the LED lamp units 100. In order to effectively attach a plurality of LED lamp units onto a housing 250, the LED lamp units may be divided into more than one row. For example, referring to FIGS. 2A and 2B, two rows of first LED lamp units 100 are attached onto a housing 250.

A headlamp for a vehicle may be designed to include a housing 250 and one or more LED lamp units 100 that are attached onto the housing 250. A headlamp including more than one LED lamp unit 100 can satisfy the international standard for luminous flux, which ranges from 600 to 1000 lumens. Therefore, it is possible to provide an AFLS capable of realizing various beam patterns while satisfying the international standard for luminous flux, by attaching one or more lamp units that can generate various beam patterns onto a housing.

For example, eight LED lamp units 100, like the LED lamp unit 100 shown in FIG. 1, may be mounted on a housing 250, as illustrated in FIGS. 2A and 2B. The eight LED lamp units 100 may be divided into a number of groups that perform different functions.

Figure 3A:
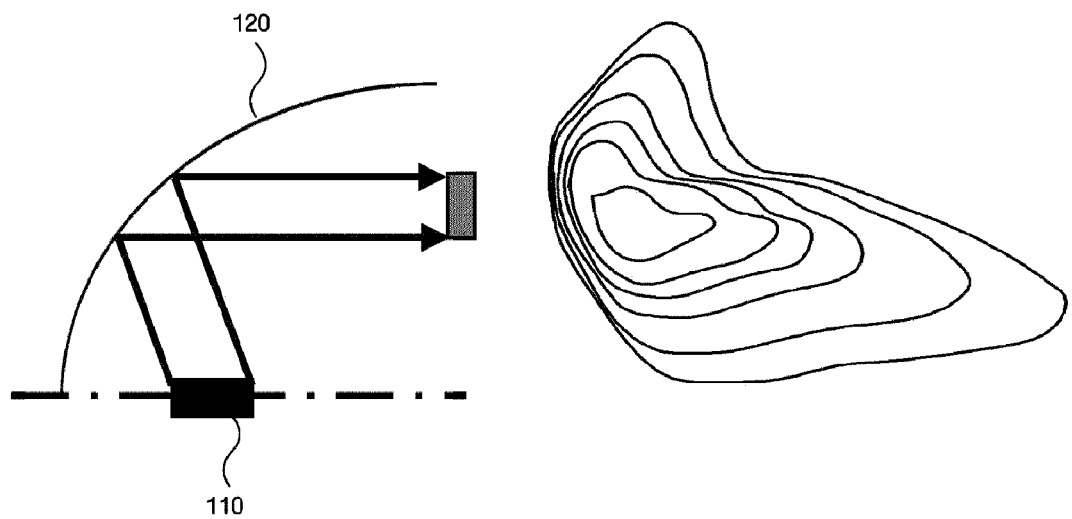
FIGS. 3A through 3F illustrate the structures of reflectors of a hot-LED-lamp unit, a spread-LED-lamp unit and a middle-LED-lamp unit, and road beam patterns formed by a hot-LED-lamp unit, a spread-LED-lamp unit and a middle-LED-lamp unit.
Figure 3B:
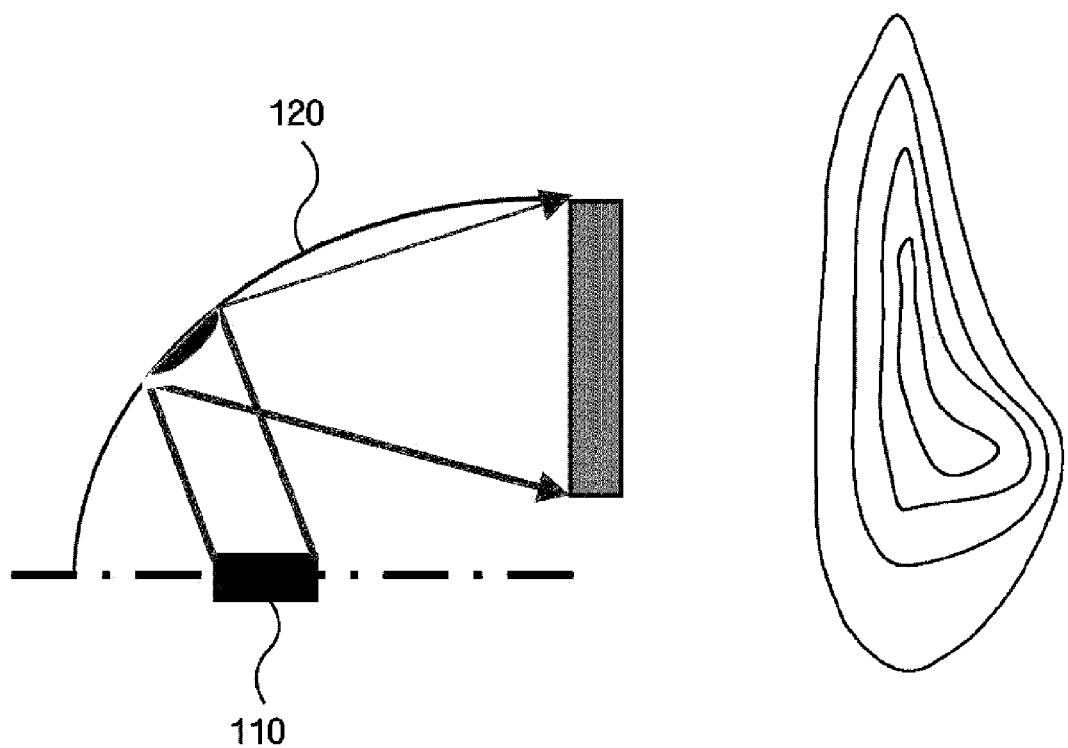
Figure 3C:
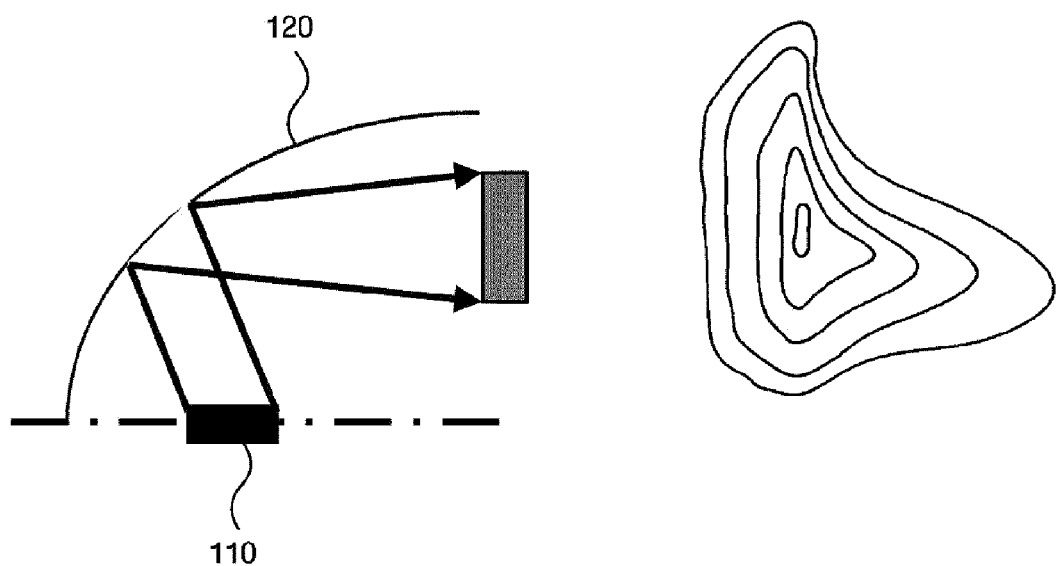
Figure 3D:
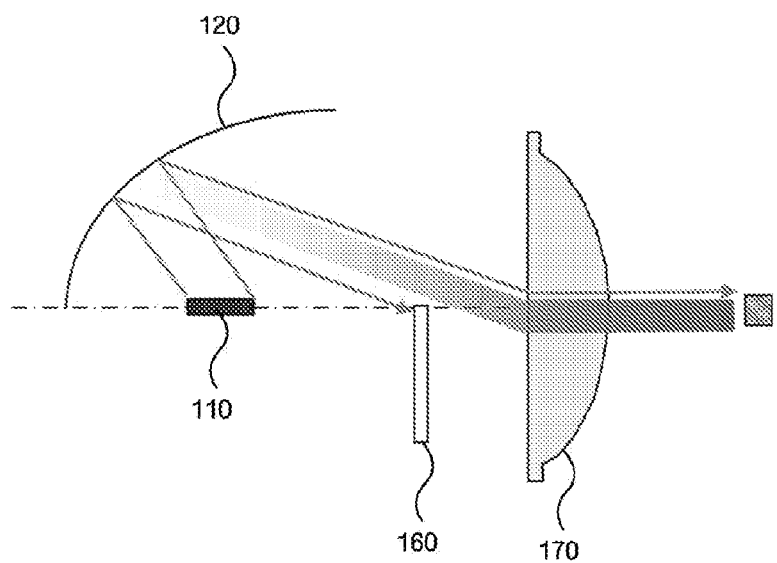
Figure 3E:
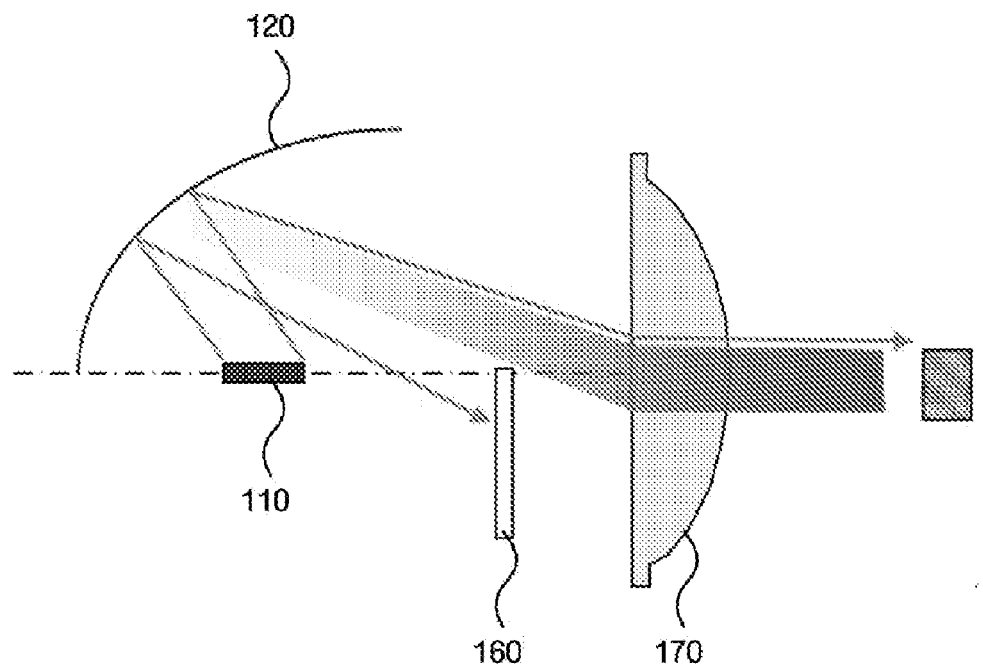
Figure 3F:
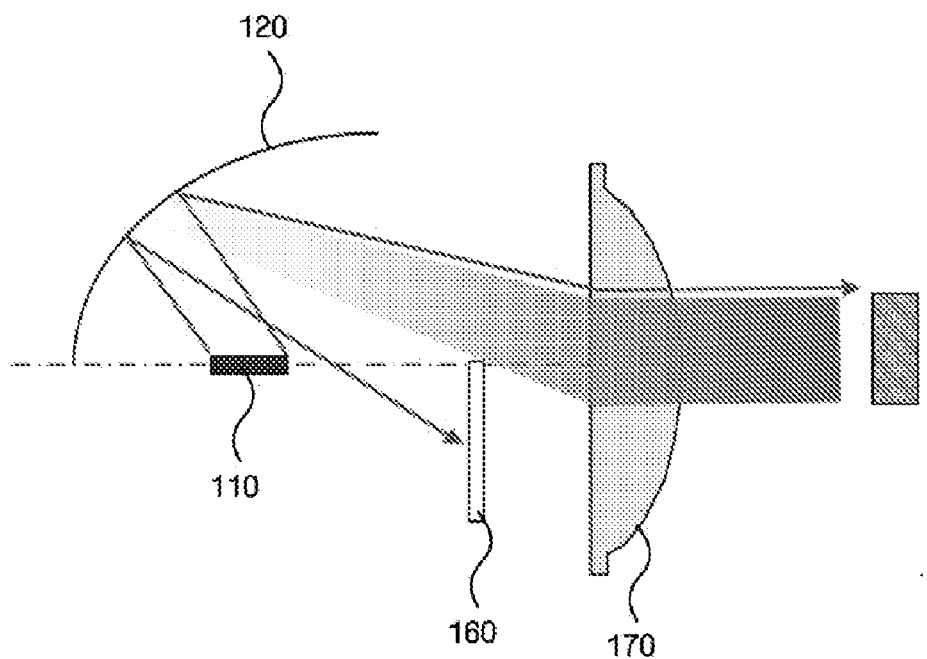

FIGS. 3A through 3F illustrate the structures of reflectors of a hot-LED-lamp unit, a spread-LED-lamp unit, and a middle-LED-lamp unit and road beam patterns formed by a hot-LED-lamp unit, a spread-LED-lamp unit, and a middle-LED-lamp unit. More specifically, FIGS. 3A through 3C illustrate various beam patterns formed by a first LED lamp unit 100, and FIGS. 3D through 3F illustrate various beam patterns formed by a second LED lamp unit 150.

An AFLS 200 may include one or more LED head lamps 100, and each of the LED head lamps 100 may be classified as being a hot-LED-lamp unit, a middle-LED-lamp unit, a spread-LED-lamp unit, or a high-LED-lamp unit.

A hot-LED-lamp unit can emit light over a long distance. More specifically, referring to FIG. 3A or 3D, a hot-LED-lamp unit including a reflector 120 having a large curvature radius can effectively concentrate light and emit the concentrated light over a long distance. FIG. 3A illustrates a road beam pattern formed by a hot-LED-lamp unit. Referring to FIG. 3A, light generated by a hot LED lamp can be emitted forward and can cover not only a short distance but also a long distance. In general, a hot-LED-lamp unit may emit light over a longer distance to the right than to the left for the pedestrians on a sidewalk on the right side of a vehicle to notice the presence of the vehicle.

A spread-LED-lamp unit may emit light over a wider area than a hot-LED-lamp unit. Referring to FIGS. 3B and 3E, the vertical and horizontal curvature radiuses of a reflector 120 of a spread-LED-lamp unit are smaller than the vertical and horizontal curvature radiuses of a reflector 120 of a hot-LED-lamp unit. Thus, light generated by a spread-LED-lamp unit can reach a shorter distance but a wider area than light generated by a hot-LED-lamp unit. Referring to FIGS. 3B and 3E, a reflector 120 of a spread-LED-lamp unit may include a plurality of concave cells so that light can spread vertically and horizontally over a wide area. Therefore, a road beam pattern formed by a spread-LED-lamp unit, i.e., the road beam pattern of FIG. 3B, vertically extends longer than a road beam pattern formed by a hot-LED-lamp unit, i.e., the road beam pattern of FIG. 3A.

A middle-LED-lamp unit may perform both the function of a hot-LED-lamp unit and the function of a spread-LED-lamp unit. That is, a middle-LED-lamp unit, like a hot-LED-lamp unit, may be able to emit light over a long distance. Also, a middle-LED-lamp unit, like a spread-LED-lamp unit, may be able to spread light over a wide area. For this, referring to FIGS. 3C and 3D, the curvature radius of a reflector 120 of a middle-LED-lamp unit may be smaller than the curvature radius of a reflector 120 of a hot-LED-lamp unit and larger than the curvature radius of a spread-LED-lamp unit so that the degree to which light emitted forward by a middle-LED-lamp unit spreads can fall in the range of the degree to which light emitted forward by a hot-LED-lamp unit and the degree to which light emitted forward by a spread-LED-lamp unit spreads. Therefore, a road beam pattern formed by a middle-LED-lamp unit, i.e., the road beam pattern of FIG. 3C, horizontally extends shorter but vertically extends longer than a road beam pattern formed by a hot-LED-lamp unit, i.e., the road beam pattern of FIG. 3A. Also, the road beam pattern of FIG. 3C horizontally extends longer but vertically extends shorter than a road beam pattern formed by a spread-LED-lamp unit, i.e., the road beam pattern of FIG. 3B.

A high-LED-lamp unit can emit light over a long distance. The location of a row of LEDs in a high-LED-lamp unit may be appropriately determined such that light generated by a high-LED-lamp unit can be emitted over a long distance. More specifically, a row of LEDs may be disposed lower in a high-LED-lamp unit than in a typical LED lamp unit (e.g., the LED lamp unit shown in FIG. 1B) so that the height of light reflected from a reflector of a high-LED-lamp unit can become greater than the height of light reflected from a reflector of a typical LED lamp unit. Therefore, a high-LED-lamp unit can emit light high in the air so that the light can reach a long distance.

A hot-LED-lamp unit, a spread-LED-lamp unit, a middle-LED-lamp unit and a high-LED-lamp unit may be used in an AFLS. For example, a total of eight LED lamp units 100, including three hot-LED-lamp units, one middle-LED-lamp unit, two spread-LED-lamp units and two high-LED-lamp units, may be included in an AFLS, as shown in FIGS. 2A and 2B. In this case, the eight LED lamp units 100 may be arranged in various manners. For example, the eight LED lamp units 100 may be divided into two rows of an upper row including five LED lamp units 100 and a lower row including three LED lamp units 100, as shown in FIG. 2A. Alternatively, the eight LED lamp units 100 may be divided into two rows, each including four LED lamp units 100.

Six LED lamp units 100, instead of eight LED lamp units 100, may be included in an AFLS, as shown in FIGS. 2C and 2D. The six LED lamp units 100 may include first LED lamp units 100 and/or second LED lamp units 150. The number of LED lamp units 100 that can be included in an AFLS may be determined so that the AFLS can provide an appropriate luminous flux level.

FIGS. 4A through 4E illustrate the road beam patterns for a basic low beam, a basic high beam, a town beam, a motorway beam, and a wet road beam, and FIGS. 5A through 5E illustrate the road beam patterns for a basic low beam, a basic high beam, a town beam, a motorway beam, and a wet road beam actually provided by an AFLS using an LED headlamp, according to an exemplary embodiment of the present invention.

A plurality of road beam patterns that are required for use in a vehicle may be formed by controlling each of a plurality of lamp units included in a headlamp. The width and length of light generated by a headlamp of an AFLS may be varied according to the circumstances of a vehicle such as driving conditions, road conditions, and other environmental conditions. The road beam patterns that are required for use in a vehicle may be classified into a basic low beam, a basic high beam, a town beam, a motorway beam and a wet road beam.

The road beam patterns for a basic low beam, a basic high beam, a town beam, a motorway beam and a wet road beam, i.e., the road beam patterns illustrated in FIGS. 4A through 4E, may be formed by selectively turning on or off a plurality of LED lamp units, including at least one hot-LED-lamp unit, at least one spread-LED-lamp unit, at least one middle-LED-lamp unit and at least one high-LED-lamp unit, and this will hereinafter be described in detail.

Figure 4A:
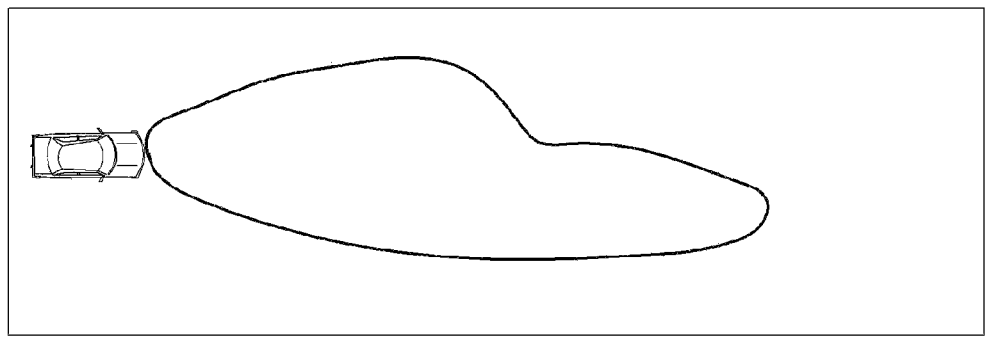
FIGS. 4A through 4E illustrate the road beam patterns for a basic low beam, a basic high beam, a town beam, a motorway beam, and a wet road beam.

The road beam pattern for a basic low beam, i.e., the road beam pattern shown in FIG. 4A, may be formed using three hot-LED-lamp units and two spread-LED-lamp units. More specifically, a left front area within a close range of a vehicle and a distant right front area from the vehicle are illuminated using three hot-LED-lamp units, and light is spread over the left front area within the close range of the vehicle using two spread-LED-lamp units. In this manner, the road beam pattern of FIG. 5A, which is similar to the road beam pattern of FIG. 4A, can be obtained. In general, a basic low beam may be used more than other beams.

Figure 5A:
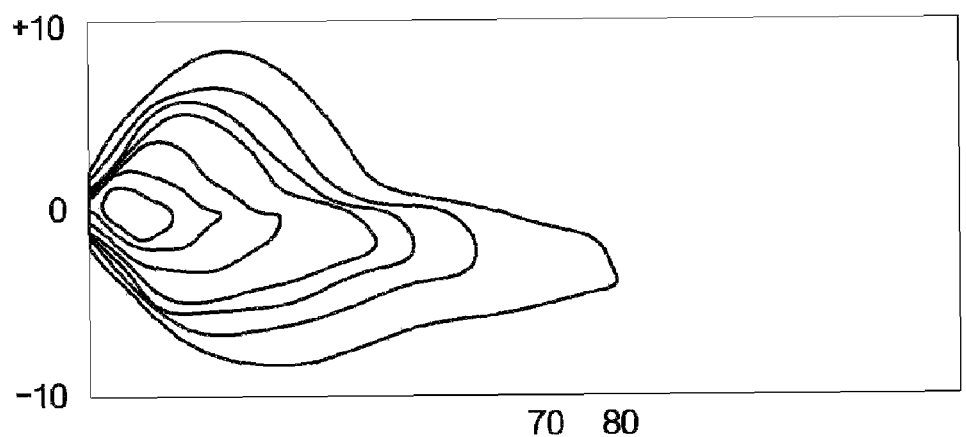
FIGS. 5A through 5E illustrate the road beam patterns for a basic low beam, a basic high beam, a town beam, a motorway beam, and a wet road beam formed by an AFLS using an LED headlamp, according to an exemplary embodiment of the present invention.

For example, referring to FIG. 2A, if first, second and third LED lamps 100 are hot-LED-lamp units and fourth and seventh LED lamp units 100 are spread-LED-lamp units, the first, second, third, fourth and seventh LED lamp units 100 may be turned on, and fifth and sixth LED lamp units may be turned off, thereby emitting a basic low beam and obtaining the road beam pattern of FIG. 5A, which is similar to the road beam pattern of FIG. 4A.

Figure 4B:
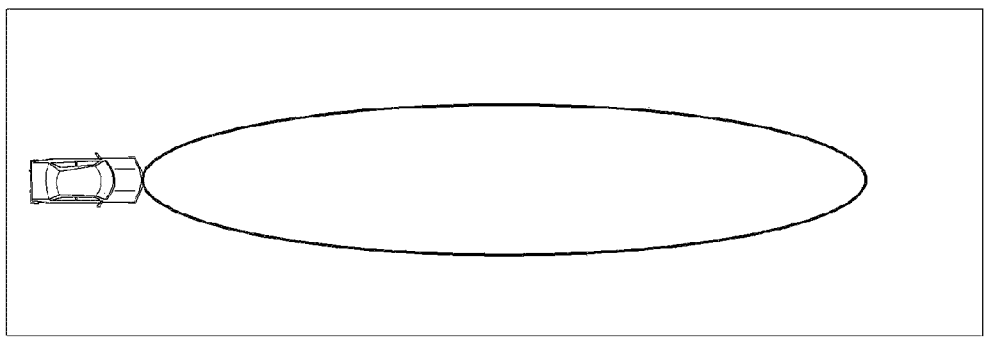
Figure 5B:
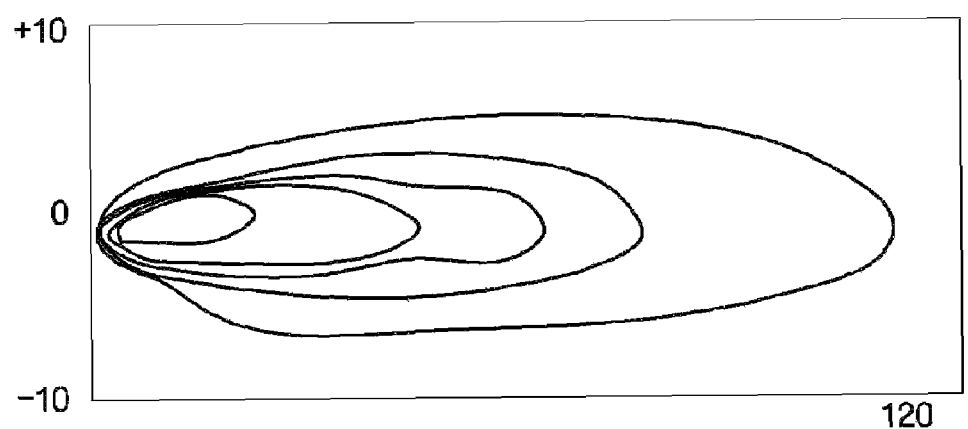
Figure 5C:
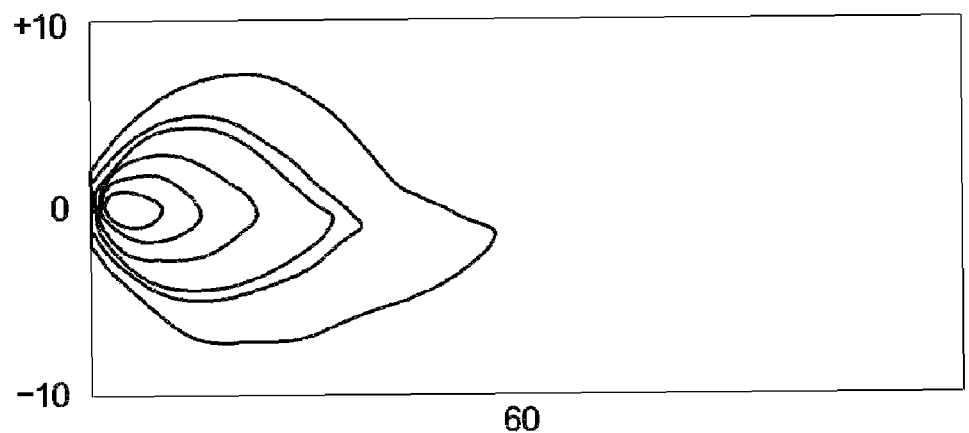
Figure 5D:
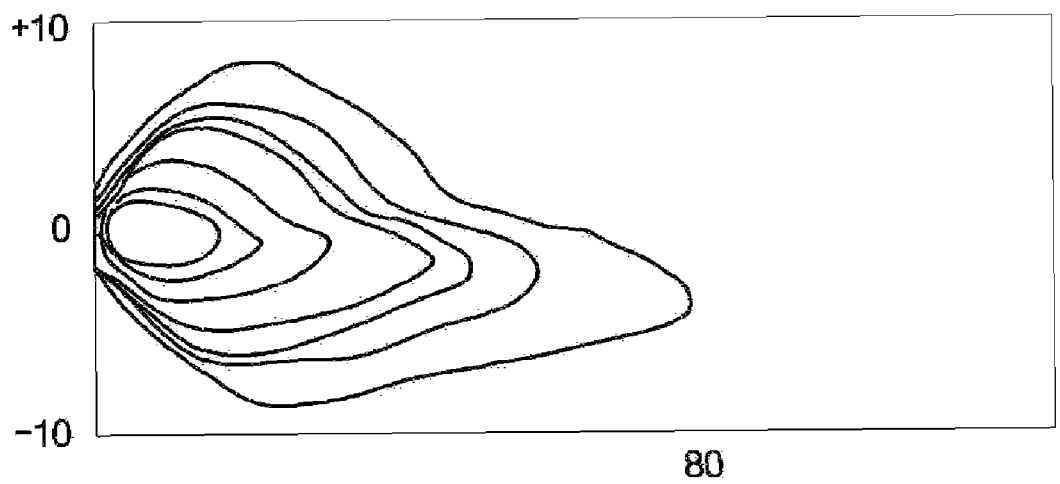
Figure 5E:
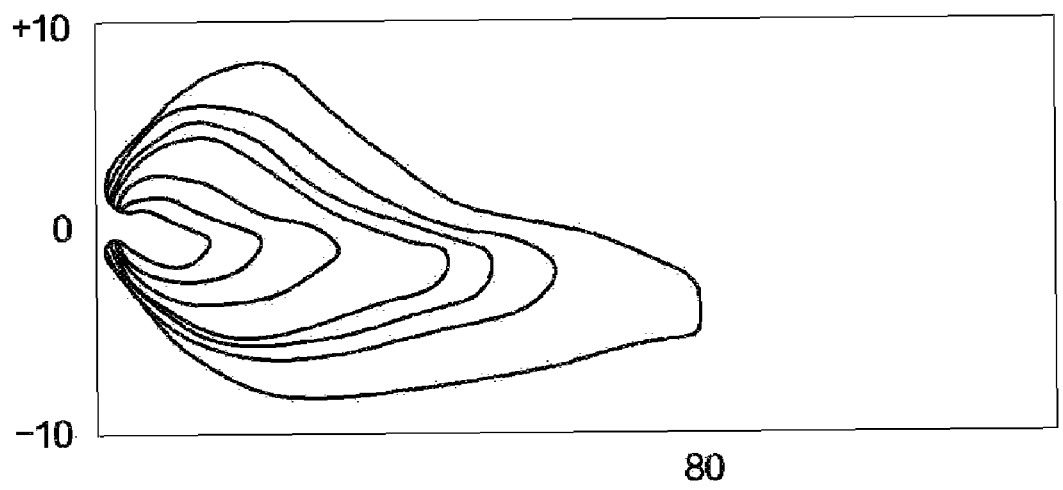

The road beam pattern for a basic high beam, i.e., the road beam pattern of FIG. 4B, may be obtained by illuminating left and right front areas within a close range of a vehicle using two spread-LED-lamp units, illuminating a distant front area from the vehicle using two high-LED-lamp units, and illuminating a middle area between the area illuminated by the two spread-LED-lamp units and the area illuminated by the two high-LED-lamp units using one middle-LED-lamp unit. In this manner, it is possible to emit light over a short distance, a middle distance, and a long distance, as shown in FIG. 5B.

Figure 4C:
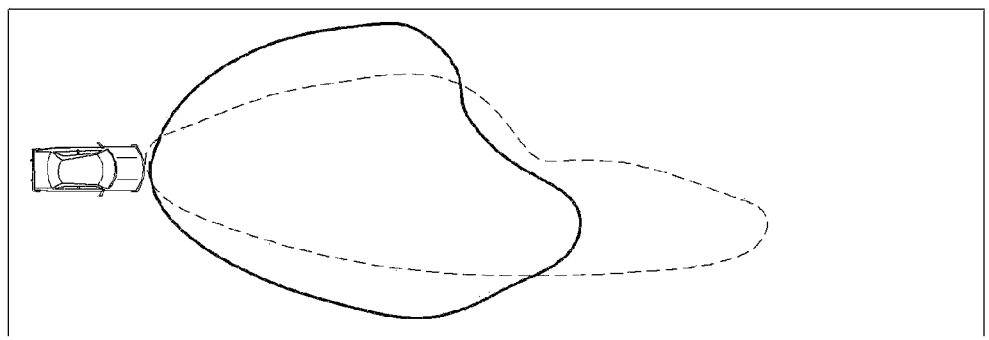

The road beam pattern for a town beam, i.e., the road beam pattern of FIG. 4C, may be formed by using one hot-LED-lamp unit, two spread-LED-lamp units and one middle-LED-lamp unit. More specifically, a wide area in front of a vehicle is illuminated using two spread-LED-lamp units, a distant right front area from the vehicle is illuminated using one hot-LED-lamp unit, and an area between the area illuminated by the two spread-LED-lamp units and the area illuminated by the hot-LED-lamp unit is illuminated using one middle-LED-lamp unit. In this manner, it is possible to emit light over a relatively wide area within a close range or a mid range of a vehicle, as shown in FIG. 4C. When driving in urban cities where there is a plenty of external illumination such as street lamps and neon signs, a driver may use a town beam to reduce unnecessary glare and thus increase the field of vision of drivers on the opposing traffic during night. For example, a town beam may be used when the speed of a vehicle is lower than 60 km/h and either the luminance of the surface of a road is higher than 1 cd/m$^2$ or horizontal road illumination is more than 10 lx.

Figure 4D:
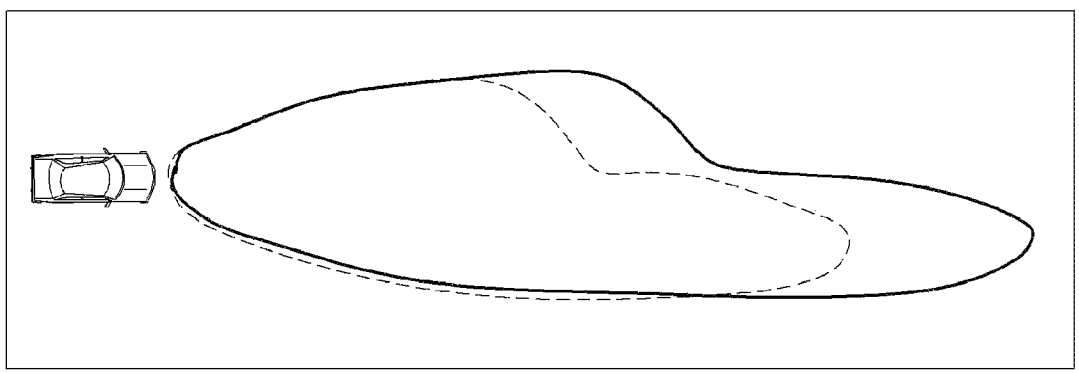

When driving on highways, a driver may need a motorway beam having the road beam pattern of FIG. 4D in order to increase the field of vision while not decreasing the field of vision of other drivers. The road beam pattern of FIG. 4D may be formed by illuminating a distant front right area from a vehicle using three hot-LED-lamp units, illuminating a front area within a close range of the vehicle using two spread-LED-lamp units, and illuminating an area between the area illuminated by the three hot-LED-lamp units and the area illuminated by the two spread-LED-lamp units using one middle lamp unit. In this manner, the road beam pattern of FIG. 5D can be obtained and is similar to the road beam pattern of FIG. 4D. A motorway beam may be used when driving on highways and/or at high speed.

Figure 4E:
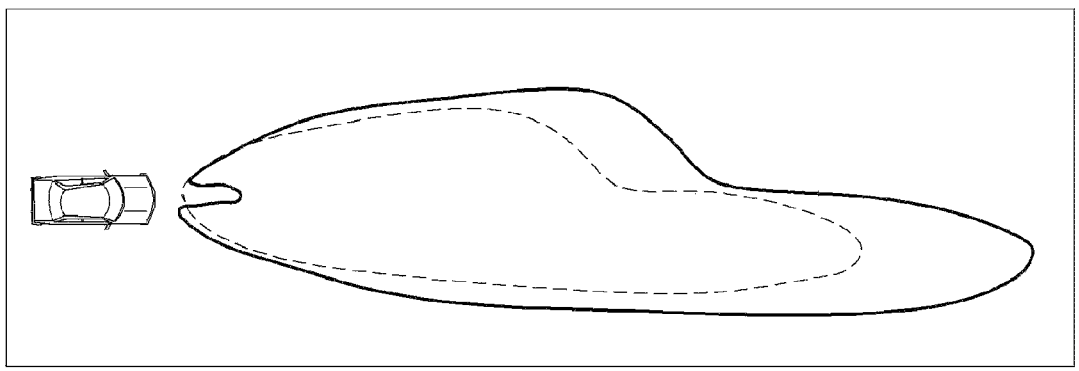

FIG. 4E illustrates the road beam pattern for a wet road beam. In general, driving in the rain or on wet roads is highly likely to reduce the field of vision of a driver. Thus, it is necessary to provide clear long-range and middle-range visions for a driver. In addition, in the case of driving on wet roads, it is necessary to dim the close-range vision of a driver to reduce glare caused by other drivers. For this, a distant front right area from a vehicle may be illuminated using three hot-LED-lamp units and an area between the distant front right area and a front area within a close range of the vehicle may be illuminated using one middle-LED-lamp unit, thereby realizing the road beam pattern of FIG. 5E, which is similar to the road beam pattern of FIG. 4E. Therefore, it is possible to an ideal road beam pattern for a wet road beam by selectively turning on or off a plurality of LED lamp units. A wet road beam may be used when the surface of a road is detected to be wet or when wipers are switched on.

In short, the road beam patterns illustrated in FIGS. 4A through 4E may all be formed by selectively turning on or off a plurality of LED lamp units, including at least one hot-LED-lamp unit, at least one spread-LED-lamp unit, at least one middle-LED-lamp unit and at least one high-LED-lamp unit, in various manners.

The road beam patterns for a basic low beam, a basic high beam, a town beam, a motorway beam and a wet road beam which are obtained by an AFLS using an LED headlamp, according to an exemplary embodiment of the present invention, are shown in FIG. 5A through 5E.

The road beam patterns of FIGS. 5A through 5E are similar to their respective counterparts of FIGS. 4A through 4E. Therefore, all the road beam patterns that are required for use in a vehicle may be formed by selectively turning on or off a plurality of LED lamp units, including at least one hot-LED-lamp unit, at least one spread-LED-lamp unit, at least one middle-LED-lamp unit and at least one high-LED-lamp unit.

Various beam patterns may be formed according to driving situations or weather conditions by selectively turning on or off various types of LED lamp units included in a headlamp. Here, the various types of LED lamp units may be manually turned on or off by a driver. Alternatively, menus for emitting a basic low beam, a basic high beam, a town beam, a motorway beam, and a wet road beam may be provided. Then, when a driver selects one of the menus, the various types of LED lamp units may be automatically turned on or off in a manner that suits the selected menu.

In addition, various beam patterns may also be formed according to driving situations or weather conditions by detecting the speed of a vehicle and road illumination using sensors and selectively turning on or off a plurality of LED lamp units, including at least one hot-LED-lamp unit, at least one spread-LED-lamp unit, at least one middle-LED-lamp unit and at least one high-LED-lamp unit, according to the results of the detection.

Figure 6:
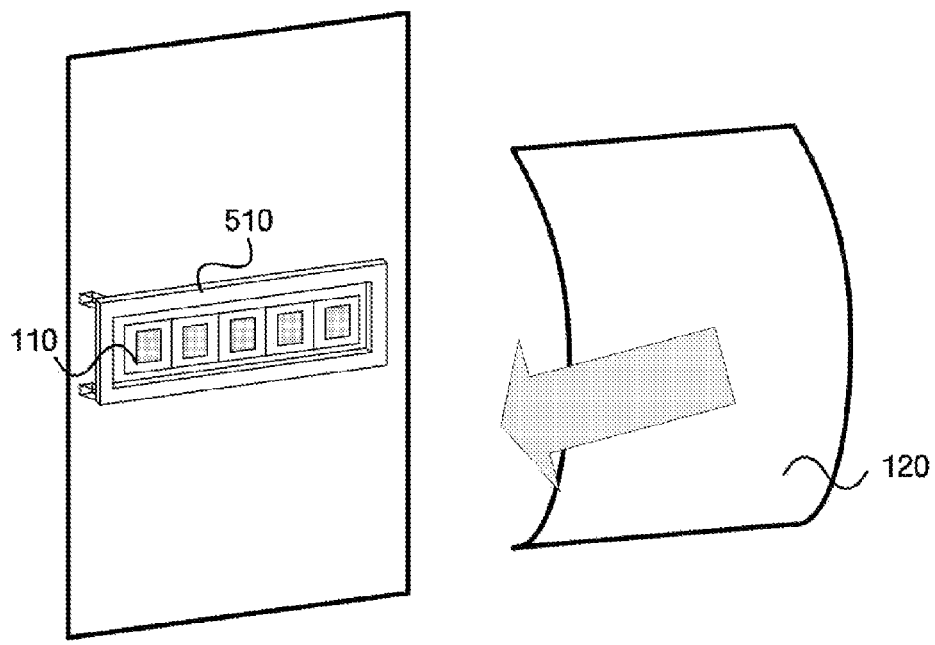
FIG. 6 illustrates an LED lamp unit including a light absorber, according to an exemplary embodiment of the present invention.
Figure 7:
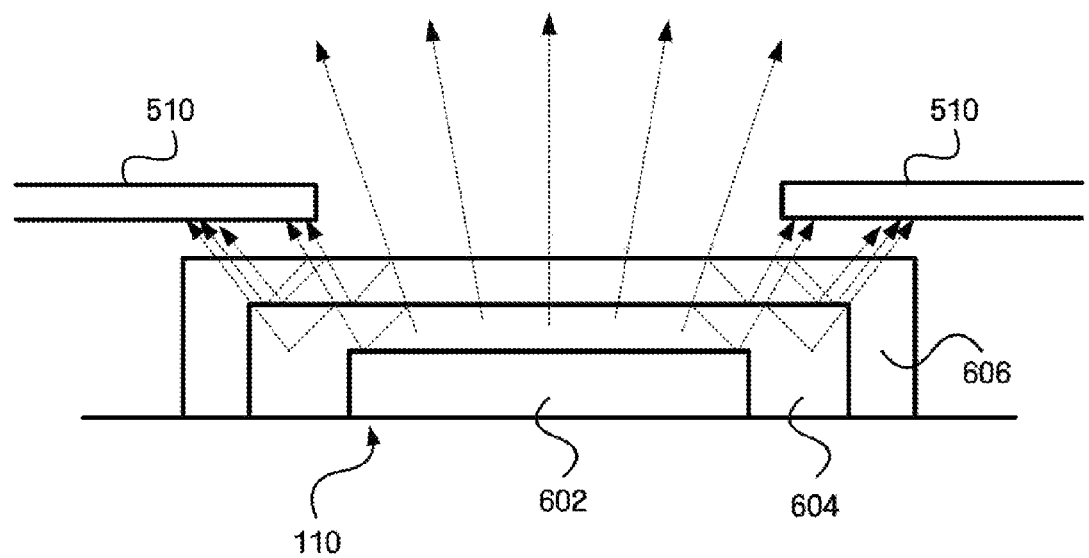
FIG. 7 illustrates the operating principle of the LED lamp unit shown in FIG. 6.

FIG. 6 illustrates an LED lamp unit 100 having a light absorber, according to an exemplary embodiment of the present invention, and FIG. 7 illustrates the operating principle of the LED lamp unit 100 illustrated in FIG. 6. Referring to FIG. 6, an AFLS using an LED headlamp may include an LED lamp unit 100, a housing 250, and a light absorber 510 which reduces glare.

The LED lamp unit 100 and the housing 250 have already been described in detail with FIGS. 1A through 5E, and thus, detailed descriptions of the LED lamp unit 100 and the housing 250 will be skipped.

The light absorber 510 reduces glare around an LED light source. An LED light source causes glare due to its characteristics. Such glare may cause problems when it is necessary to not emit light high as in the case of emitting a low beam.

Therefore, the light absorber 510 may include a plate which is disposed above or below an LED light source. Referring to FIG. 6, the LED lamp unit 100 includes a row of five LEDs and the light absorber 510. The light absorber 510 may surround the boundaries of a light source and may thus prevent glare around the light source. Therefore, referring to FIG. 6, light emitted from an LED light source may become rectangular by passing through the light absorber 510.

The light absorber 510 may be installed above or below an LED light source and may thus block the upper or lower boundary of the LED light source. Glare may result in irregular road beam patterns and low beams or high beams that cannot meet the related requirements. In order to prevent glare, the light absorber 510 may be disposed above or below an LED light source. The location of the light absorber 510 relative to an LED light source may be determined according to whether or not a beam pattern formed by the LED light source is inverted. If a beam pattern formed by an LED light source is not inverted, the light absorber 510 may be disposed above the LED light source.

Referring to FIG. 7, an LED light source may include an LED chip 602, a phosphor 604 which surrounds the LED chip 602, and a package 606 which hermetically seals the LED light source by using an epoxy or silicon. The LED chip 602 emits light. The light emitted by the LED chip 602 may travel toward the outside of the LED light source by passing through the LED chip 602, the phosphor 604, and the package 606. When passing through the space between the LED chip 602 and the phosphor 604 and the space between the phosphor 604 and the package 606, part of the light emitted by the LED chip 602 may be reflected. The reflected light may be attenuated by passing through the LED chip 602, the phosphor 604 and the package 606. Since the direction of the reflected light is different from the direction of the original light emitted by the LED chip 602, the reflected light may cause glare. In order to block the reflected light, the light absorber 510 may be provided. In this manner, it is possible to obtain clear beam patterns with sharp edges.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An adaptive front light system (AFLS) for a vehicle, the AFLS comprising:
    a plurality of light-emitting diode (LED) lamp units; and
    a housing which accommodates the LED lamp unit or units,
    wherein: each of the LED lamp units comprises one or more LEDs as its light source and a reflector which is provided commonly for the light sources and reflects light emitted by the light source so that the reflected light can be directed forward; the AFLS is operable to form different beam patterns by selectively turning on or off the lamp units; and one or more of the reflectors are multi face reflectors (MFR) each including a plurality of cells having different curvature radiuses or focal points 2. The AFLS of claim 1, wherein each of the LED lamp units further comprises:
    a shield which shields part of light reflected by a corresponding reflector; and
    a lens which concentrates the reflected light in a forward direction.

3. The AFLS of claim 1, wherein the AFLS is operable to form one of a hot beam pattern, a middle beam pattern, a spread beam pattern and a high beam pattern by selectively turning on or off the LED lamp units.

4. The AFLS of claim 1, wherein the lamp units comprise three hot-LED-lamp units, one middle-LED-lamp unit, two spread-LED-lamp units and one high-LED-lamp unit.

5. The AFLS of claim 1, further comprising a power supply module which applies power to the LED lamp units.

6. The AFLS of claim 1, wherein each of the light-source of the LED lamp units comprises a light absorber which is disposed above or below a corresponding LED-light-source and reduces glare.

7. The AFLS of claim 1, wherein each of the one or more LEDs of the LED lamp units comprises a light absorber which has a through hole having the same shape as that of a corresponding LED-light-source and absorbs boundaries of light emitted by the corresponding LED-light-source.

8. An adaptive front light system (AFLS) for a vehicle, the AFLS comprising:
    one or more light-emitting diode (LED) lamp units; and
    a housing which accommodates the LED lamp unit or units,
    wherein: each of the LED lamp units comprises one or more LEDs as its light source and a reflector which is provided commonly for the light sources and reflects light emitted by the light source so that the reflected light can be directed forward; and the reflectors of the lamp units have different curvature radiuses so that the lamp units be operable to form different beam patterns.

9. The AFLS of claim 8, wherein the lamp units comprise at least one of a hot-LED-lamp unit, a middle-LED-lamp unit, a spread-LED-lamp unit and a high-LED-lamp unit.

10. The AFLS of claim 8, wherein the curvature radiuses of the reflectors of the LED lamp units vary according to whether the LED lamp units are hot-LED-lamp units, middle-LED-lamp units, or spread-LED-lamp units.

11. The AFLS of claim 8, wherein one or more of the reflectors are multi face reflectors (MFR) each including one or more cells having different curvature radiuses or focal points.

12. The AFLS of claim 8, wherein each of the LED lamp units further comprises:
    a shield which shields part of light reflected by the reflector; and a lens which concentrates the light reflected by the reflector in a forward direction.

13. The AFLS of claim 8, wherein the AFLS is operable to form one of a hot beam pattern, a middle beam pattern, a spread beam pattern and a high beam pattern by selectively turning on or off the LED lamp units.

14. The AFLS of claim 8, wherein the reflectors of some of the LED lamp units are MFRs each including one or more cells having different curvature radiuses or focal points and the reflectors of the other LED lamp units are projection-type reflectors having different vertical and horizontal curvature radiuses.

15. The AFLS of claim 8, wherein the AFLS is operable to form different beam patterns by selectively turning on or off the LED lamp units.

\* \* \* \* \*